A. S. HOWELL.
LIGHT CONTROL MECHANISM FOR CINEMATOGRAPHIC AND LIKE APPARATUS.
APPLICATION FILED SEPT. 27, 1915.
1,247,682.
Patented Nov. 27, 1917.
2 SHEETS—SHEET 2.
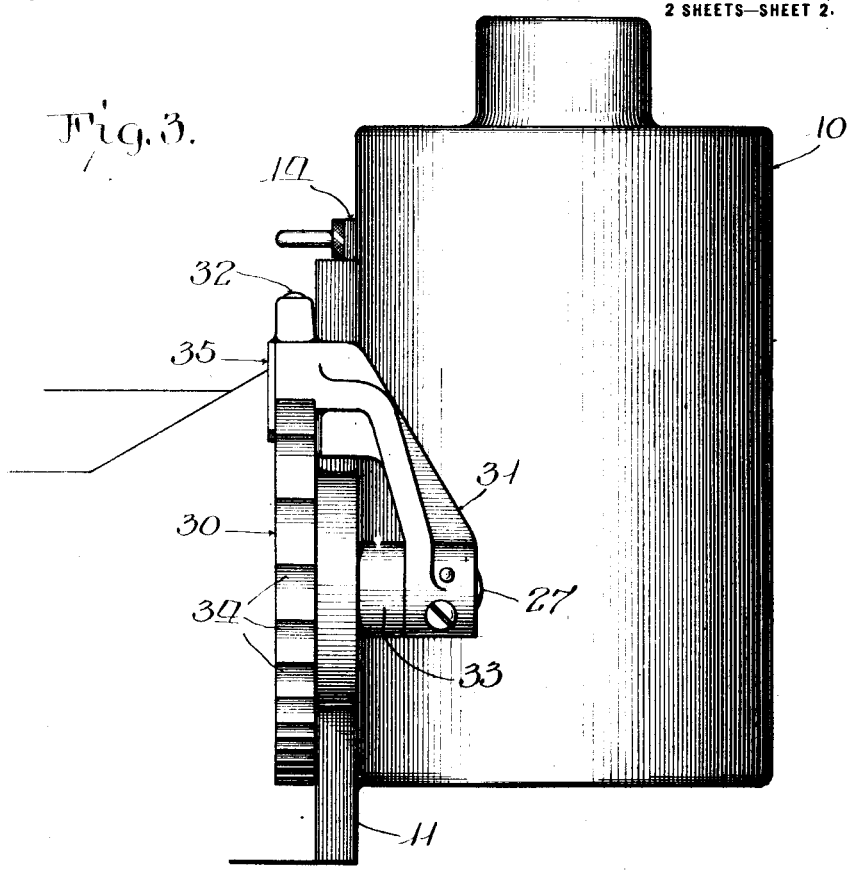
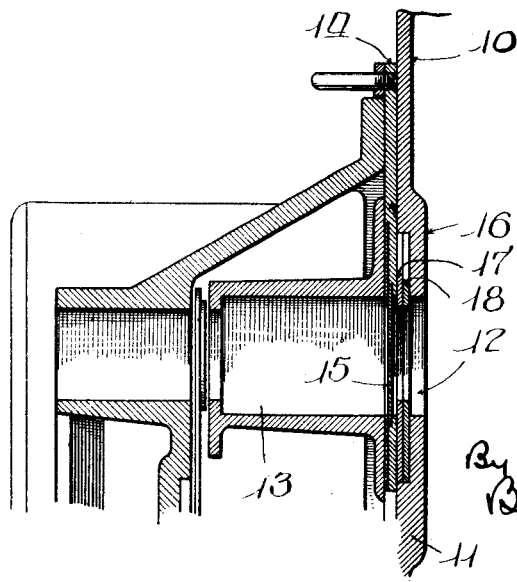
Inventor:
Albert S. Howell
By Benjamin, Roodhouse & Lundy
attorneys.

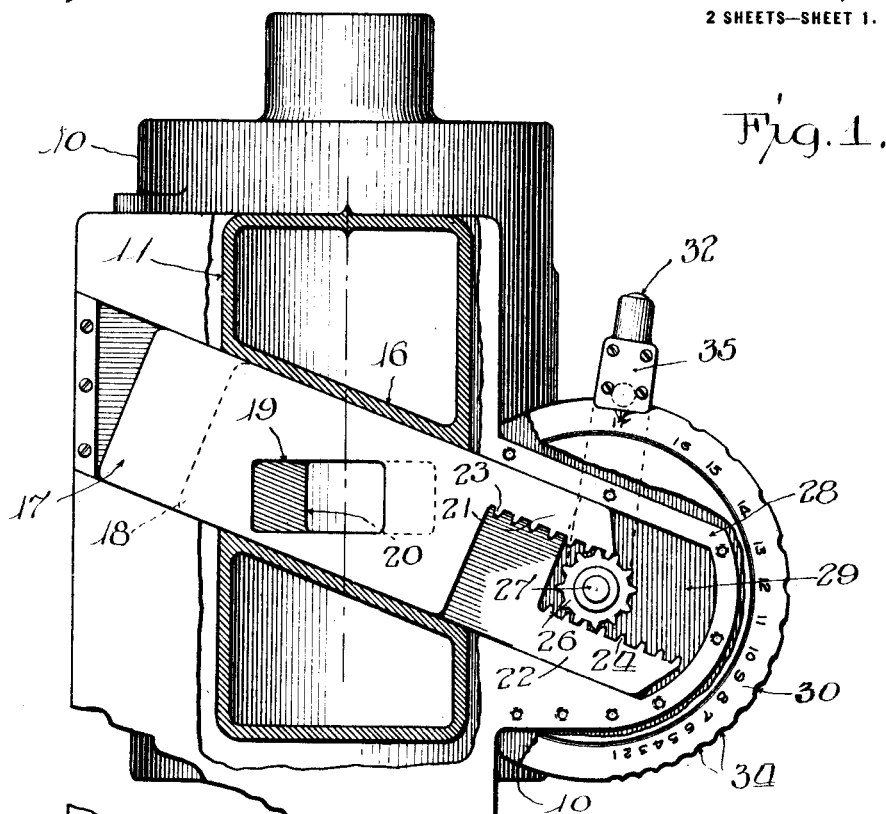
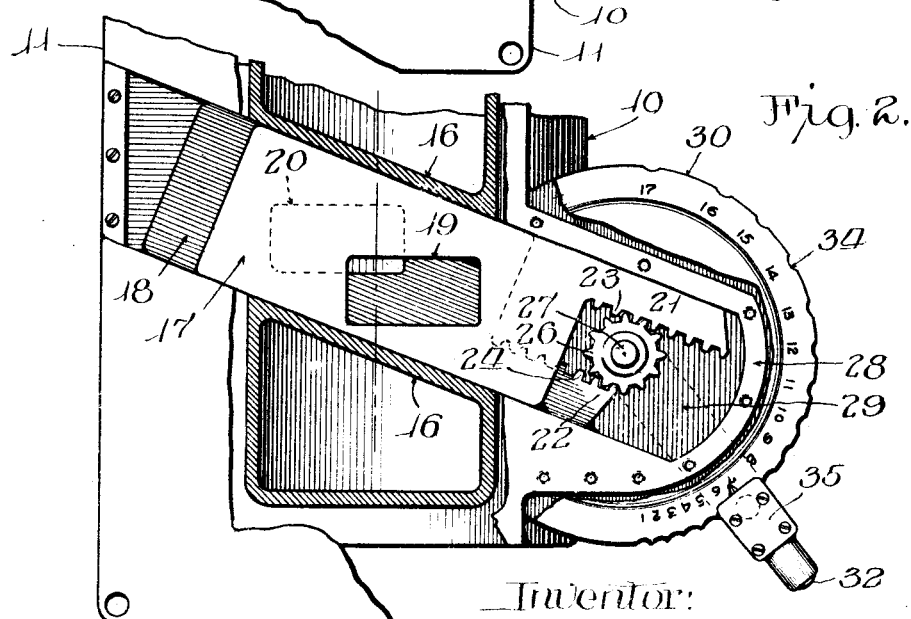

UNITED STATES PATENT OFFICE.

ALBERT S. HOWELL, OF CHICAGO, ILLINOIS, ASSIGNOR TO BELL & HOWELL COMPANY, OF CHICAGO, ILLINOIS, A CORPORATION OF ILLINOIS.

LIGHT-CONTROL MECHANISM FOR CINEMATOGRAPHIC AND LIKE APPARATUS.

1,247,682.  Specification of Letters Patent.  Patented Nov. 27, 1917.

Original application filed April 22, 1915, Serial No. 23,020. Divided and this application filed September 27, 1915. Serial No. 52,834.

*To all whom it may concern:*

Be it known that I, ALBERT S. HOWELL, a citizen of the United States, and a resident of the city of Chicago, county of Cook, and State of Illinois, have invented certain new and useful Improvements in Light-Control Mechanism for Cinematographic and like Apparatus, of which the following is a specification.

My invention relates to cinematographs and, more particularly, that branch of the art known as "printing machines" wherein the negative film from a cinematograph camera is adapted to be moved past a light opening or aperture in conjunction with an unexposed positive film for the purpose of printing the successive views of the negative film upon the positive film. An apparatus of this character is particularly shown and described in an application for Letters Patent of the United States filed by me April 22, 1915, for improvements in control means for motion picture printing machines, Serial Number 23,020, whereof my present application is a division. More particularly, my invention relates to devices for controlling the intensity of the light passing through the light passage or the aperture and through the superimposed negative and positive films in a cinematographic printing machine.

As is well known, the negative films in cinematography generally comprise several sets of negative pictures in series, photographed in both natural and artificial light, of various degrees of intensity, and the negative when developed is of a variety of densities. In order to obtain a positive film of a uniform density, it is necessary to increase the light where the negative film is dense, and to decrease the light where the negative film is not so dense.

The principal object of my invention therefore is the provision of simple and effective means for controlling the intensity of light so that the quantity of the rays passing from the lamp house may be graduated and regulated to a nicety, in order that the positive film will be printed in substantially a uniform density. Another object of my invention is the provision of devices for increasing or diminishing the intensity of light that are effective in operation and the area of the aperture is so definitely indicated that the employment of a skilled mechanic is unnecessary for manipulating the machine.

I prefer to accomplish the objects of my invention by the means and in the manner heretofore fully described and as more particularly pointed out in the claims, reference being had to the accompanying drawings forming a part of this specification, wherein, Figure 1 is a sectional view of a lamp house, showing my improved light-controlling mechanism applied thereto.

Fig. 2 is a fragmentary view of a similar portion of a lamp house, showing the diaphragm plates in a different position, for the purpose of reducing the area of the light opening therein.

Fig. 3 is a side elevation of the apparatus taken at a right angle to Fig. 1.

Fig. 4 is a transverse vertical section of a fragmentary portion of a cinematographic apparatus, taken through the axis of the aperture element thereof and showing the relative location of my improved light-controlling mechanism.

Referring to the drawings, it will be seen the devices for adjusting the quantity of light passing through the aperture comprise the cylindrical-shaped lamp house 10 that is vertically disposed and is provided with vertically elongated, hollow embossment 11 upon one side, through which an opening 12 of suitable dimensions is made in alinement with the aperture element 13 of the apparatus. A vertically movable metal slide 14, having a rectangular opening therein covered by a ground glass 15, is disposed in front of this opening 12 of the embossment for the purpose of diffusing the light waves radiating from the source of illumination within the lamp house 10. A transversely disposed inclined guideway is formed across said embossment by suitable inclined webs or flanges 16 that are arranged parallel to each other and in vertically alining planes. Suitable rectangular-shaped diaphragm plates 17 and 18 are disposed the one in front of the other and are movably mounted in said guideway and are respectively provided with substantially rectangular-shaped elongated openings 19 and 20 that are so positioned that their edges or peripheries are in horizontal and vertical planes as shown, and said openings are adapted to register with each other to a greater or less extent. The movement and adjustment of said diaphragm plates 17 and 18 is preferably accomplished by providing the lower ends thereof with suitable elongated extensions 21 and 22, respectively, the former extension projecting from the lower edge of diaphragm plate 18 as shown in Figs. 1 and 2 of the drawings. The lower and upper edges respectively of these extensions 21 and 22 are provided with racks 23 and 24 that face each other so that they may mesh with and be actuated, preferably simultaneously, by a single pinion 26, the rotation of which latter will move the diaphragm plates 17 and 18 in opposite inclined directions, as shown in Figs. 1 and 2 of the drawings.

Pinion 26 is mounted upon the adjacent end of a suitable arbor 27 journaled in a bearing boss 33 projecting rearwardly from the central portion of a segmental-shaped plate 28 secured to and projecting laterally from the embossment 11 of the lamp house 10. Said segmental plate 28 is provided with a depression or recess as at 29, to accommodate the extensions and end portions of the diaphragm plates 17 and 18 that extend therein when the one or the other of said plates is moved in that direction. An outer segmental plate 30 covers the recess and prevents the lateral movement or displacement of the diaphragm plates and assists in holding the pinion 26 in position.

The arbor 27 of the pinion extends rearwardly beyond its bearings 33 where it has a suitable operating handle 31 connected thereto. This handle is formed so that its upper portion inclines inwardly toward and is adapted to engage the edge of segmental plate 30, as shown in Fig. 3 of the drawings, and said upper portion is provided with a spring-pressed plunger or pawl 32 that is adapted to engage suitable shallow concave recesses or notches 34 made transversely across the peripheral edge of said segmental plate 30. These notches are identified upon the face of the segmental plate by consecutive numerals "1" to "17," respectively, as illustrated in Fig. 1 of the drawings which will indicate to the operator the respective size or area of the opening and so that he may thereby readily determine the quantity of light passing through the aperture. A plate 35, which is provided with a suitable arrow or pointer, is preferably screwed onto the handle 31 in order to conveniently point to and indicate the position of the diaphragm plates.

Thus it will be observed that, by swinging the handle around the segmental plate, the diaphragm plates are moved in opposite directions, thus relatively increasing or diminishing the size of the continuous opening through the diaphragms whereby the quantity of light passing therethrough is regulated to a nicety and the point at which the handle is stopped by the operator is determined by reference to the index numerals upon the face of the segmental plate.

In the above description and the drawings forming a part thereof I have disclosed numerous specific devices for carrying out the objects of my invention which, of course, may be readily modified or refined for the purpose of adapting the mechanism to divers types of machines, all of which will be obvious to others skilled in the art of cinematography. I desire it understood therefore that all such modifications or refinements are contemplated within the scope of my invention as expressed in the appended claims, and I do not therein limit myself to any particular type of apparatus to which my invention is applicable.

What I claim as new is:—

1. In motion picture apparatus, an apertured element, means for controlling the quantity of light passing therethrough comprising diaphragm plates having openings therein, and means for moving said plates in opposite directions so as to cause said openings to vary in register consisting of racks carried upon the adjacent ends of said plates, a pinion engaging said racks, a lever for rotating said pinion, and a segmental plate engaged by the outer end of said lever, and having indicia thereon for indicating the adjustment of said plates.

2. In motion picture apparatus, an apertured element, means for controlling the quantity of light passing therethrough comprising diaphragm plates having openings therein, and means for moving said plates in opposite directions so as to cause said openings to vary in register consisting of racks carried upon the adjacent ends of said plates, a pinion engaging said racks, a lever for rotating said pinion, a segmental plate engaged by the outer end of said lever and having indicia thereon for indicating the adjustment of said plates, said plate having recesses adjacent the edge thereof, and a member carried by said lever adapted to engage said recesses.

Signed at Chicago, county of Cook and State of Illinois, this 21st day of September, 1915.

ALBERT S. HOWELL.

Witnesses:
E. K. LUNDY, Jr.,
WM. HAROLD EICHELMAN.